US008757450B2

(12) United States Patent
Huang et al.

(10) Patent No.: US 8,757,450 B2
(45) Date of Patent: Jun. 24, 2014

(54) ADHESIVE DISPENSING ASSEMBLY AND ADHESIVE DISPENSER USING THE ASSEMBLY

(75) Inventors: Teng-Tsung Huang, New Taipei (TW); Guo-Jun Yu, Shenzhen (CN); Yong-Bing Hu, Shenzhen (CN); Gong-Shui Cheng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/548,400

(22) Filed: Jul. 13, 2012

(65) Prior Publication Data

US 2013/0134187 A1 May 30, 2013

(30) Foreign Application Priority Data

Nov. 24, 2011 (CN) .......................... 2011 1 0378403

(51) Int. Cl.
*G01F 11/00* (2006.01)

(52) U.S. Cl.
USPC ........................................... 222/333; 222/390

(58) Field of Classification Search
USPC ........... 222/63, 326, 327, 333, 341, 390, 391; 118/305, 323, 410; 401/172; 604/224; 156/378, 349, 367
See application file for complete search history.

(56) References Cited

U.S. PATENT DOCUMENTS

| | | | | |
|---|---|---|---|---|
| 5,348,585 | A * | 9/1994 | Weston | 118/305 |
| 5,462,199 | A * | 10/1995 | Lenhardt | 222/54 |
| 5,505,777 | A * | 4/1996 | Ciardella et al. | 118/663 |
| 5,553,740 | A * | 9/1996 | King et al. | 222/1 |
| 6,021,925 | A * | 2/2000 | Gashgaee et al. | 222/333 |
| 7,001,464 | B1 * | 2/2006 | Erdman et al. | 118/305 |
| 7,810,635 | B2 * | 10/2010 | Kim et al. | 198/817 |
| 7,980,197 | B2 * | 7/2011 | Prentice et al. | 118/688 |
| 2010/0017031 | A1 * | 1/2010 | Rob et al. | 700/245 |
| 2012/0240690 | A1 * | 9/2012 | Huang et al. | 73/862.01 |

* cited by examiner

*Primary Examiner* — Frederick C Nicolas
*Assistant Examiner* — Bob Zadeh
(74) *Attorney, Agent, or Firm* — Novak Druce Connolly Bove + Quigg LLP

(57) ABSTRACT

An adhesive dispensing assembly includes a positioning module, a driving rod, a guiding block, a screw nut, a moving rod, and a motor. The positioning module is for positioning an adhesive cylinder. The screw nut is secured in the guiding block and engages with the driving rod by a screw thread. The moving rod has one end fastened to the guiding block and the other end for moving the adhesive cylinder. The motor drives the driving rod to rotate to move the screw nut, the guiding block, and the moving rod in one direction or another. An adhesive dispenser using the assembly is also described.

7 Claims, 5 Drawing Sheets

ADHESIVE DISPENSING ASSEMBLY AND ADHESIVE DISPENSER USING THE ASSEMBLY

BACKGROUND

1. Technical Field

The present disclosure relates to an adhesive dispensing assembly, especially to an automatic adhesive dispensing assembly and an adhesive dispenser using the assembly.

2. Description of Related Art

Adhesive dispensers or related art are commonly pneumatically controlled to press or dispense adhesive out of storage cylinders and onto products. However, pneumatically controlled adhesive dispensers can be difficult to precisely extrude the desired amount of adhesive.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
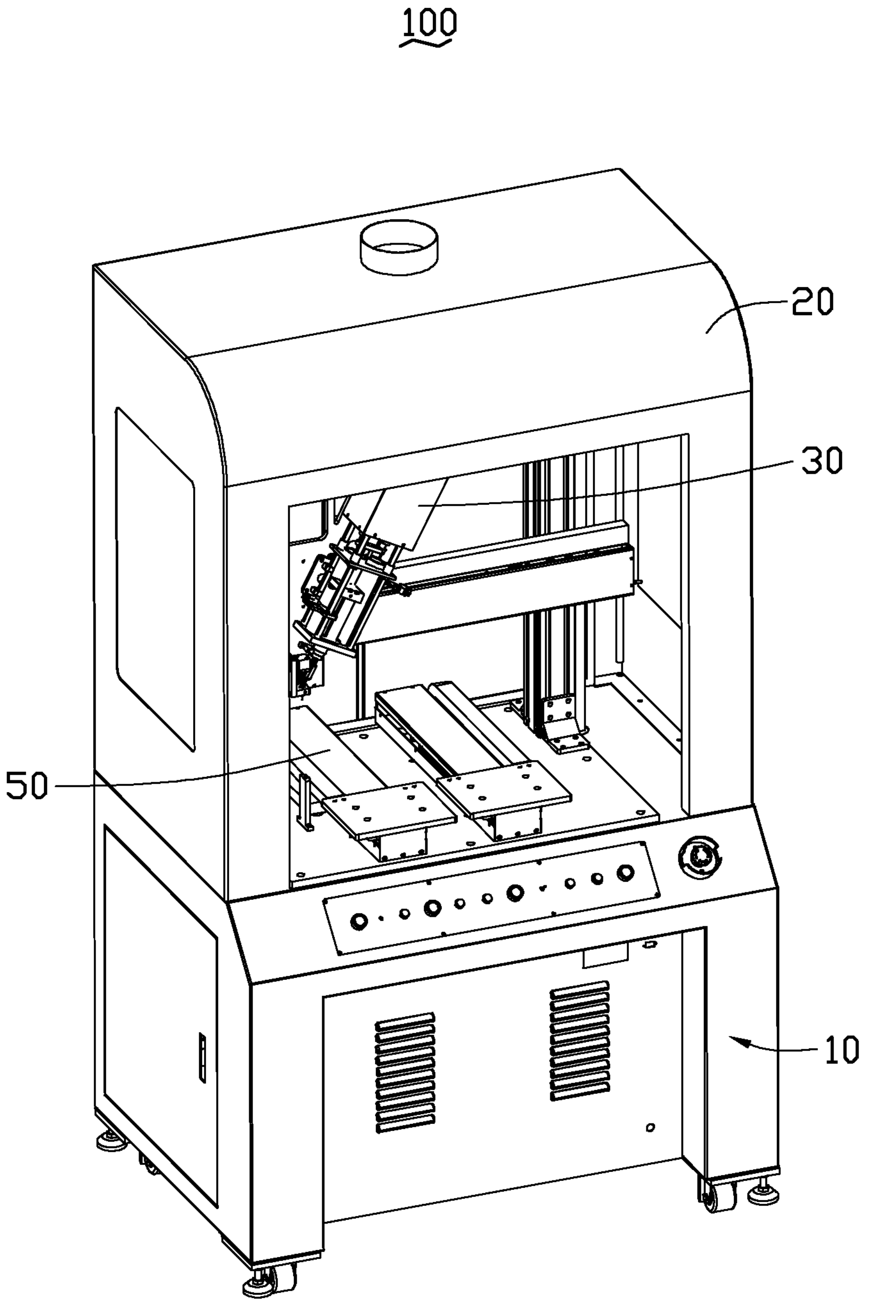
FIG. 1 is an isometric view of an exemplary embodiment of an adhesive dispenser.

Referring to FIG. 1, an adhesive dispenser 100 according to an exemplary embodiment is for dispensing adhesive onto products (not shown), such as onto the housings of electronic devices. The adhesive dispenser 100 includes a base 10, a shielding cover 20, an adhesive dispensing assembly 30, and a moving assembly 50.

The shielding cover 20 is supported on the base 10. The adhesive dispensing assembly 30 and the moving assembly 50 are positioned in the shielding cover 20.

Figure 2:
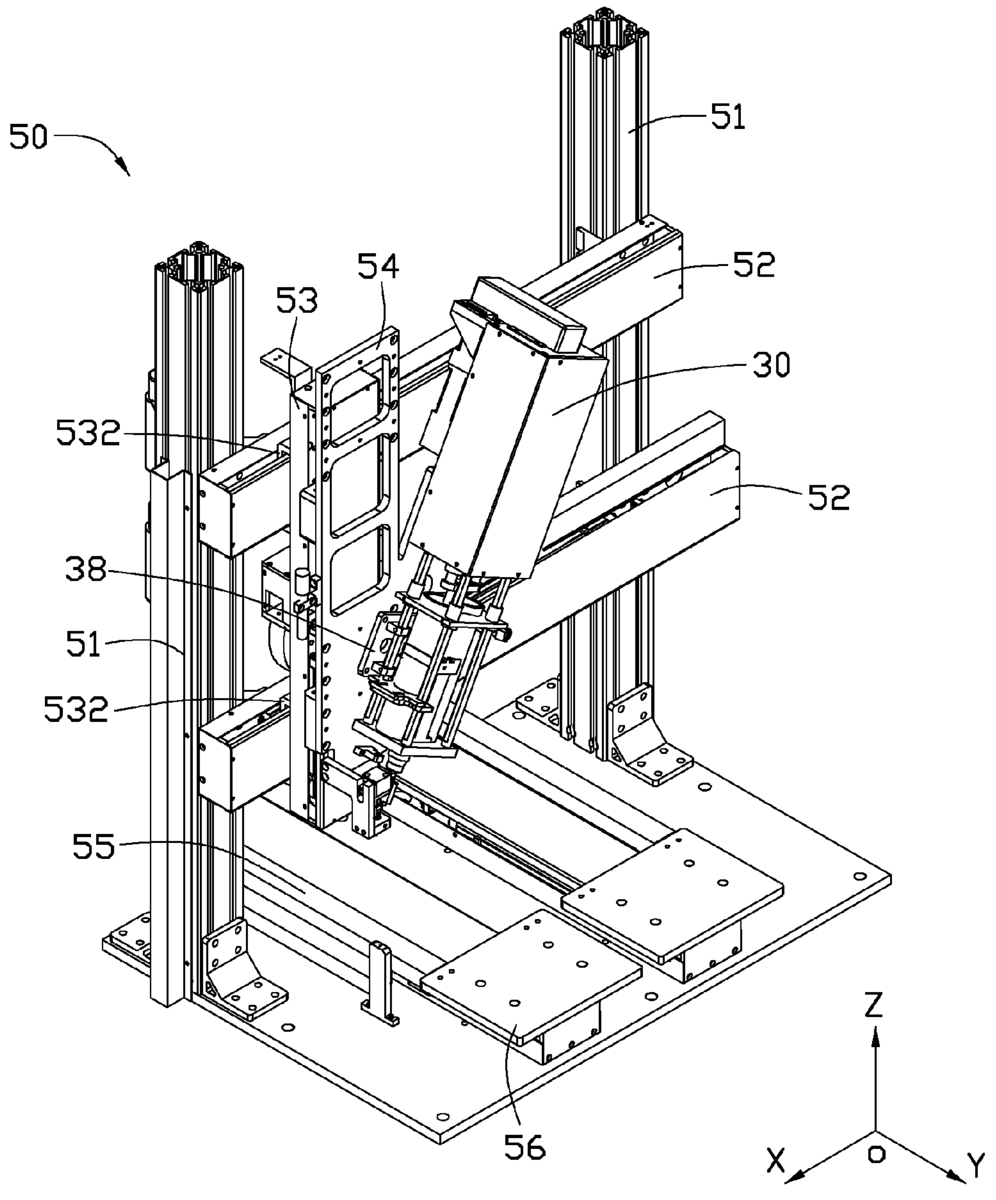
FIG. 2 is a view of an adhesive dispensing assembly and a moving assembly of the adhesive dispenser shown in FIG. 1.
Figure 3:
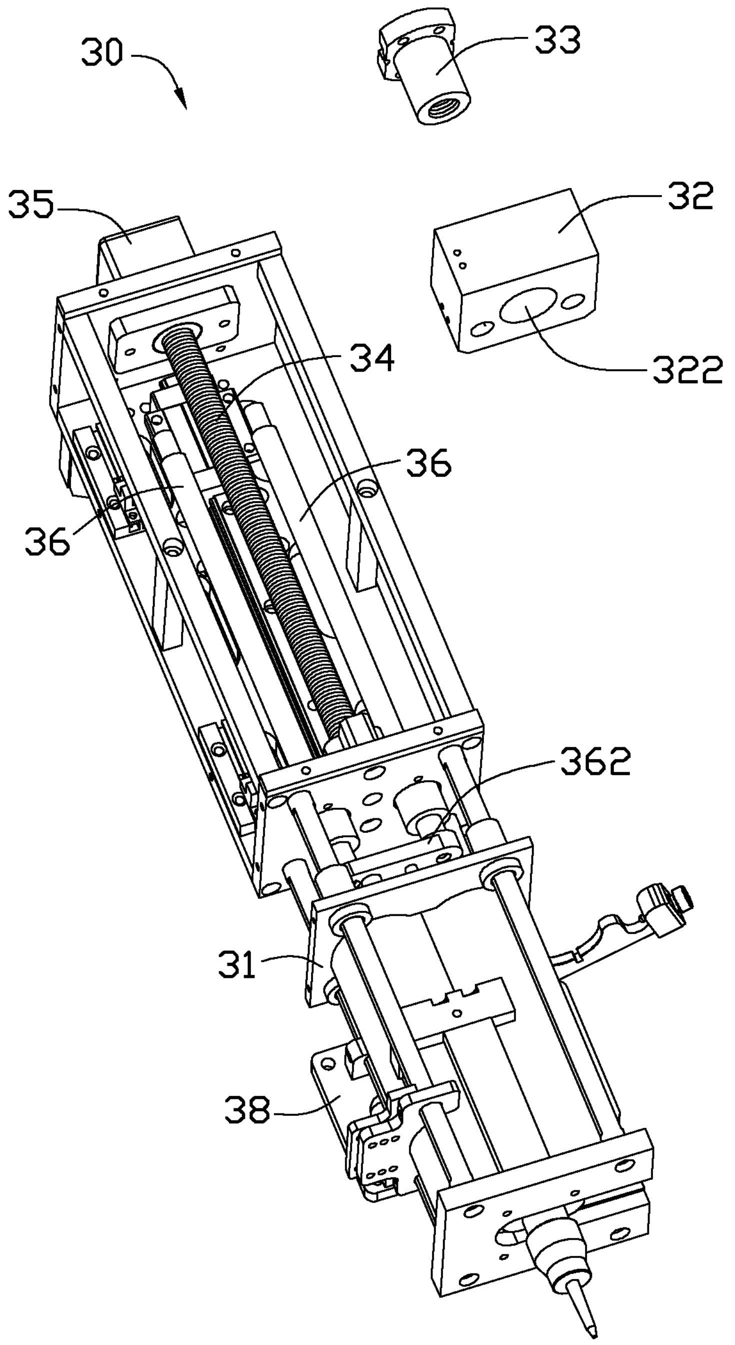
FIG. 3 is an exploded view of the adhesive dispensing assembly shown in FIG. 2.
Figure 4:
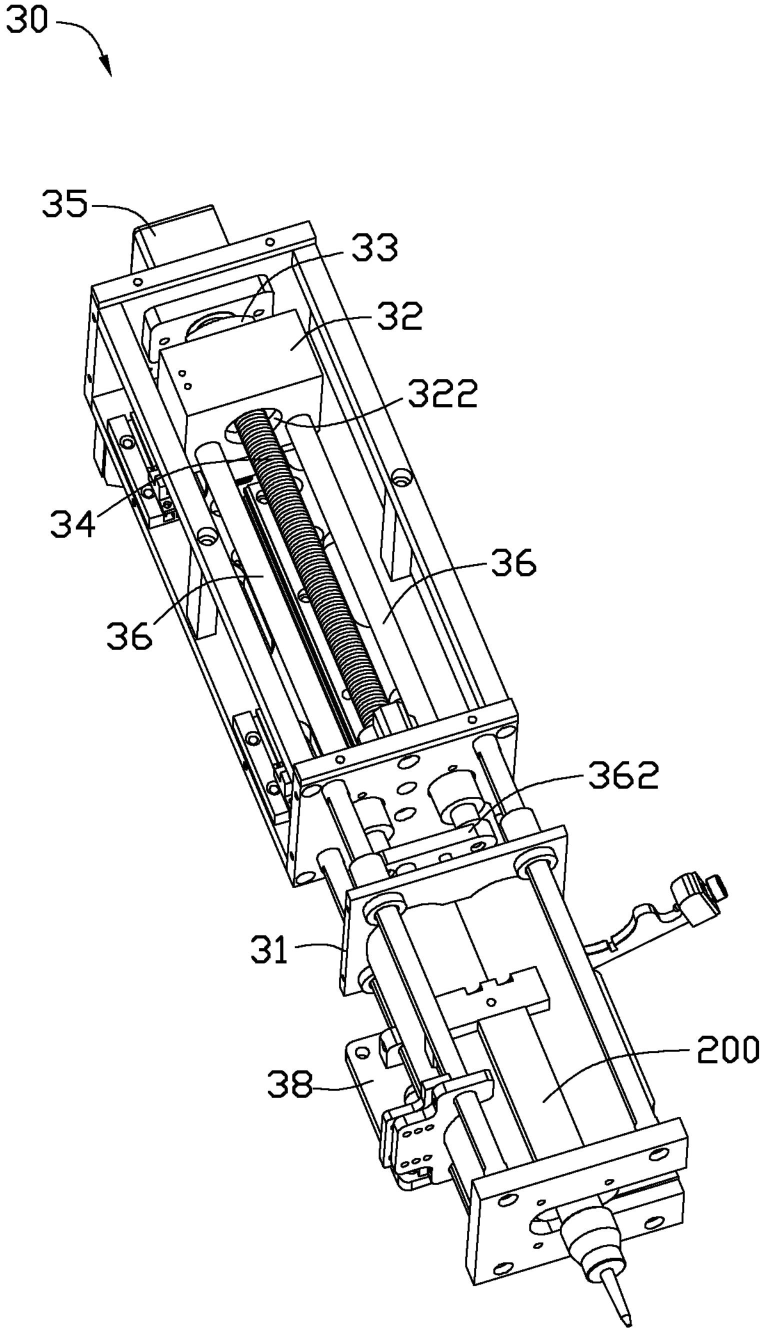
FIG. 4 is an isometric view of the adhesive dispensing assembly shown in FIG. 2.

Referring to FIGS. 2, 3, and 4, the adhesive dispensing assembly 30 is for controlling an adhesive cylinder 200 to dispense adhesive. The adhesive dispensing assembly 30 is connected to the moving assembly 50. The moving assembly 50 drives the adhesive dispensing assembly 30 to move.

The adhesive dispensing assembly 30 includes a positioning module 31, a guiding block 32, a screw nut 33, a driving rod 34, a motor 35, and two moving rods 36. The positioning module 31 is for positioning the adhesive cylinder 200. When the adhesive cylinder 200 is mounted in the positioning module 31, the nozzle of the adhesive cylinder 200 is exposed from one side of the positioning module 31.

The guiding block 32 defines a through hole 322. The screw nut 33 is engaged in the through hole 322 and secured in the guiding block 32. The driving rod 34 passes through the through hole 322 and screw thread engages with the screw nut 33. The motor 35 drives the driving rod 34 to rotate relative to the screw nut 33, which moves the screw nut 33 and the guiding block 32 one way or another along the driving rod 34. Each moving rod 36 has one end fastened in the guiding block 32, and the other end secured in a moving plate 362. When the moving rods 36 move along with the guiding block 32, the moving plate 362 is moved to move the adhesive cylinder 200 mounted in the positioning module 31 to dispense adhesive. The screw thread of the screw nut 33 engages with the driving rod 34 which is driven by the motor 35, the rotation speed of the driving rod 34 can be precisely controlled, and precise and very small-scale movements of the moving rods 36 can be achieved. As such, the amount of adhesive extruded from the adhesive cylinder 200 can be precisely controlled.

The moving plate 362 may be omitted, and the two moving rods 36 directly cause the adhesive cylinder 200 to dispense adhesive.

Figure 5:
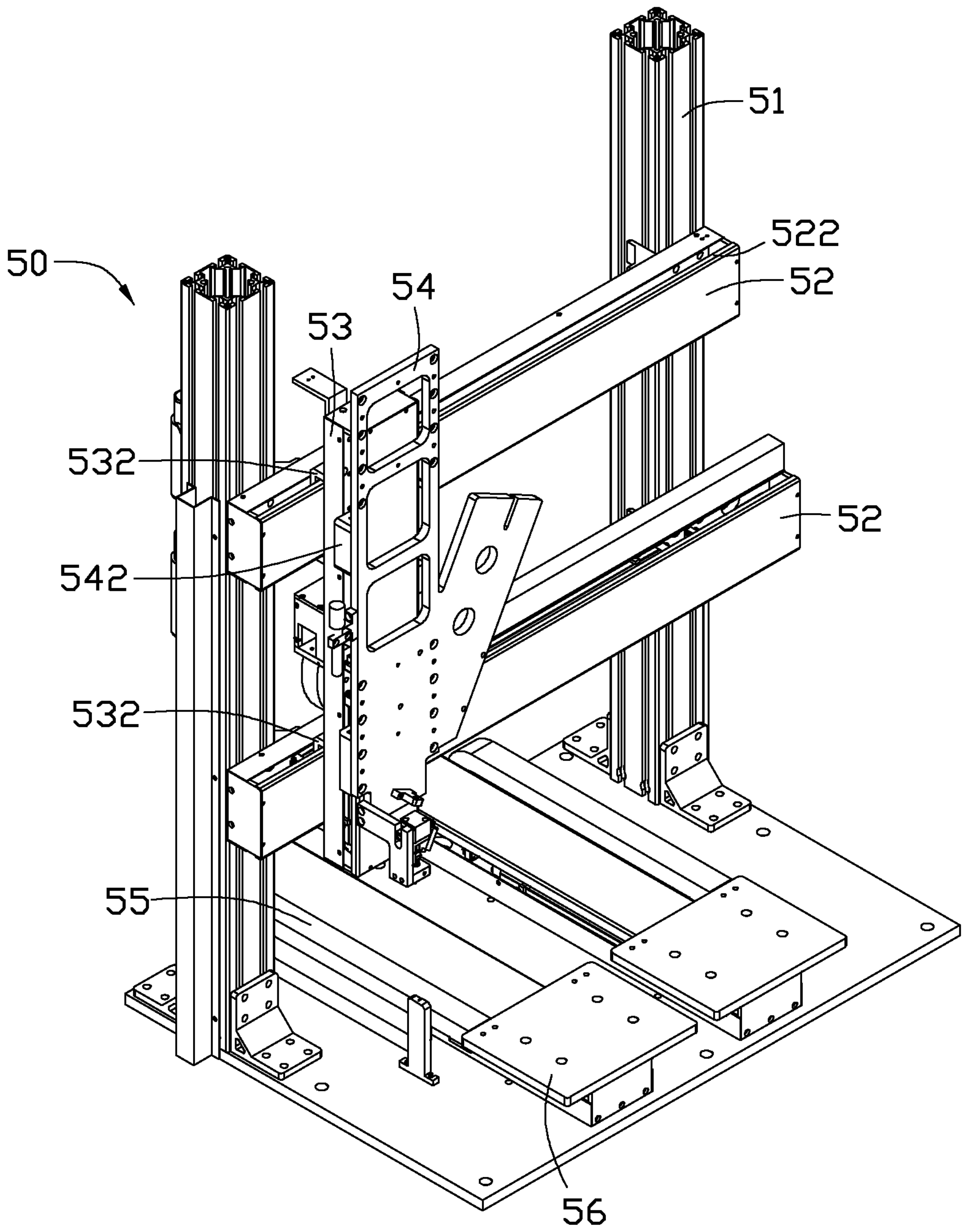
FIG. 5 is an isometric view of the moving assembly shown in FIG. 2.

FIG. 2 shows an X-Y-Z coordinate system. Also referring to FIG. 5, the moving assembly 50 is for moving the adhesive dispensing assembly 30 along the X-axis, the Y-axis, and the Z-axis. The moving assembly 50 includes two posts 51, two fastening plates 52, a connecting plate 53, a slide plate 54, two guiding plates 55, and two seats 56. The two posts 51 are vertically supported on the base 10. The two fastening plate 52 are arranged in parallel to each other on the two posts 51. The connecting plate 53 is slidably mounted on the two fastening plates 52. Each fastening plate 52 defines a guiding rail 522. Two first slide blocks 532 are formed on the connecting plate 53. Each first slide block 532 is slidably engaged with one guiding rail 522 of one fastening plate 52, thus the connecting plate 53 can move along the fastening plates 52. The connecting plate 53 may be driven to move along the fastening plates 52 by a motor (not shown).

The slide plate 54 defines two second slide blocks 542. The two second slide blocks 542 are slidably engaged with the connecting plate 53 along the Z-axis, which allows the slide plate 54 to be slidably mounted on the connecting plate 53 along the Z-axis. The adhesive dispensing assembly 30 further includes a fastening block 38. The adhesive dispensing assembly 30 is fastened to the slide plate 54 by the fastening block 38. Since the adhesive dispensing assembly 30 is fastened to the slide plate 54, the distances along the X-direction and the Y-direction of the adhesive dispensing assembly 30 can be changed by the movement of the slide plate 54, and the position of the adhesive dispensing assembly 30 at the X-axis and the Y-axis will be adjusted.

The two guiding plates 55 are arranged in parallel on the base 10 along the Y-axis. The seats 56 are for supporting products (not shown). Each seat 56 is slidably mounted on one guiding plate 55. In the embodiment, the seats 56 are driven to move along the guiding plates 55 by a motor (not shown). To move the seats 56 along the guiding plates 55, the Y-direction distance of the adhesive dispensing assembly 30 can be changed by the movement of the seats 56, and the position of the adhesive dispensing assembly 30 at the Y-axis is adjusted. As such, to accommodate a variety of dispensing requirements, the position of the adhesive dispensing assembly 30 can be easily adjusted by moving the connecting plate 53, the slide plate 54, and the seats 56. Furthermore, the adhesive dispenser 100 includes two guiding plates 55 and two seats 56, the objects to receive adhesive can be alternately positioned on the two seats 56, which effectively improves the dispensing efficiency of the adhesive dispenser 100.

When using the adhesive dispenser 100, the adhesive cylinder 200 is fastened in the positioning module 31. The product is positioned on one of the seats 56. The seat 56 is driven to move along the guiding plate 55 to locate at a desired position. Then, the connecting plate 53 and the slide plate 54 are moved to put the adhesive dispensing assembly 30 in a desired position at the X-axis and the Z-axis to allow the nozzle of the adhesive cylinder 200 to aim at the product. The motor 35 drives the driving rod 34 to rotate. The guiding block 32 and the moving rods 36 are driven to advance a certain precise distance to cause the moving plate 362 to press or dispense the adhesive from the adhesive cylinder 200, to be extruded in a particular desired quantity. As such, a dispensing of adhesive is finished.

When adhesive has been dispensed onto one product, the motor 35 drives the driving rod 34 to rotate in reverse. The moving plate 362 moves away from the adhesive cylinder 200. The adhesive cylinder 200 is released. Then, the connecting plate 53 slides towards the other seat 56 along the fastening plates 52 to allow the nozzle of the adhesive cylinder 200 to aim at another product supported on the other seat 56, to carry out another dispensation of adhesive.

The adhesive dispenser 100 of the exemplary embodiment can precisely control the extruded amount of the adhesive. The adhesive dispenser 100 can also be used to dispense adhesive onto a great variety of objects or products.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An adhesive dispenser, comprising:

a base;

a moving assembly comprising two posts, two fastening plates, a connecting plate, and a slide plate, the two posts are vertically supported on the base, the two fastening plates being arranged in parallel to each other on the two posts, the connecting plate is slidably mounted to the two fastening plates, the slide plate being slidably mounted on the connecting plate; and an adhesive dispensing assembly secured to the slide plate and comprising:

a positioning module for positioning an adhesive cylinder;

a driving rod;

a guiding block;

a screw nut secured in the guiding block and screw threaded engaged with the driving rod;

a moving rod having one end fastened to the guiding block and the other end for moving the adhesive cylinder;

a motor driving the driving rod to rotate to move the screw nut, the guiding block, and the moving rod in one direction or another; and a shielding cover, wherein the adhesive dispensing assembly and the moving assembly are positioned in the shielding cover, and the shielding cover supported on the base.

2. The adhesive dispenser of claim 1, wherein the guiding block defines a through hole, the screw nut is engaged in the through hole and secured in the guiding block, the driving rod passes through the through hole and screw thread engages with the screw nut.

3. The adhesive dispenser of claim 1, wherein the other end of the moving rod is secured in a moving plate, and the moving plate moves along with the moving rod to move the adhesive cylinder.

4. The adhesive dispenser of claim 1, wherein each fastening plate defines a guiding rail, two first slide blocks are formed on the connecting plate, and each first slide block is slidably engaged with one guiding rail of one fastening plate.

5. The adhesive dispenser of claim 1, wherein the slide plate defines two second slide blocks, and the two second slide blocks are slidably engaged with the connecting plate.

6. The adhesive dispenser of claim 1, wherein the adhesive dispensing assembly further comprises a fastening block, and the adhesive dispensing assembly is fastened to the slide plate by the fastening block.

7. The adhesive dispenser of claim 1, further comprising two guiding plates and two seats, wherein the two guiding plates are arranged in parallel on the base, and each seat is slidably mounted on one of the guiding plates.

* * * * *